Patented May 5, 1936

2,039,364

UNITED STATES PATENT OFFICE 2,039,364

PROTECTIVE COATING

Charles A. Thomas and Carroll A. Hochwalt, Dayton, Ohio, assignors, by mesne assignments, to Monsanto Petroleum Chemicals, Inc., Dayton, Ohio, a corporation of Delaware No Drawing. Application July 24, 1930, Serial No. 470,535

30 Claims. (Cl. 134—26)

This invention relates to the manufacture of protective coating materials, such as paint, varnish, lacquers, and the like.

One of the principal objects of this invention is to provide a protective coating material which is relatively economical and of superior quality, giving an elastic and durable film which is quick drying.

Another object of the invention is to provide a protective coating material made by incorporating with a drying oil a synthetic resin which does not retard normal changes in the drying oil.

Another object of the invention is to provide a composition comprising as ingredients a synthetic resin and a drying oil reacted to produce a coating constituent material which is flexible to an extraordinary degree, and is also waterproof and acid and alkali resistant.

Other objects and advantages of the present invention will be apparent from the description thereof set out below and the appended claims.

The present application is a continuation in part of the copending application of Charles A. Thomas and Carroll A. Hochwalt, Serial No. 294,491, filed July 21, 1928, now Patent No. 1,836,629.

In the practising of our invention we preferably employ a synthetic resin produced as described in the copending applications of Charles A. Thomas and Carroll A. Hochwalt, Serial No. 294,491, filed July 21, 1928, Carroll A. Hochwalt, Serial No. 461,799, filed June 17, 1930, Charles A. Thomas, Serial No. 461,807, filed June 17, 1930. As disclosed therein, this resin is made from a fraction of cracked petroleum distillate, or from unsaturated hydrocarbons in controlled proportions and under controlled conditions, in the presence of a suitable catalyst or activating agent, such as anhydrous aluminum chloride. The resin thus produced when admixed with a drying oil, such as China-wood oil or linseed oil, or with a drying oil and a non-drying oil such as castor oil, and subjected to controlled reaction conditions, produces a material which has extraordinarily desirable characteristics as a coating material without those undesirable characteristics usually present in other materials. For example, it is an excellent material for use as an undercoating, as where the film is baked on. This material can be used either with or without pigments. Metallic driers may be used to hasten drying. The film or coating resulting from the use of this material is quick drying, substantially impervious to water, very resistant to acids and alkalies, elastic, durable, of low acid character and readily soluble in cheap solvents. It also has a highly satisfactory non-yellowing quality; that is, the film does not yellow after drying, which quality renders the material especially valuable for use with white or light colored pigments, where a yellowing material is most objectionable. This coating material is found to be quite superior both as an outside finish and also as an undercoat.

Very satisfactory results may be secured in the manufacture of the resin from a controlled mixture of single and plural double bond unsaturated hydrocarbons, under controlled conditions. For example, the mixture may contain diolefine compounds which react with good results in this manner, such as hexadiene ($CH_2=CH-CH_2-CH_2-CH=CH_2$), isoprene

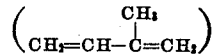

and butadiene ($CH_2=CH-CH=CH_2$), these being representative members of this plural double bond group. As examples of olefine compounds which will satisfactorily react with the diolefine compounds, in the above manner, the amylenes may be mentioned as representative. These include symmetrical methyl ethyl ethylene ($CH_3-CH_2-CH=CH-CH_3$), unsymmetrical methyl ethyl ethylene

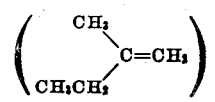

trimethyl ethylene

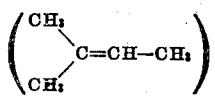

and normal propyl ethylene or pentene —2 ($CH_3-CH_2-CH_2-CH=CH_2$). Other saturated hydrocarbons having one double bond or olefines will react in this manner with diolefines. Thus ethylene ($CH_2=CH_2$) can be used by feeding in the compound as a gas into the reaction mixture. Likewise propylene ($CH_3CH-CH_2$) and octylene ($C_8H_{16}$) produce resins in this manner.

The resin may be produced, for example, by reaction or polymerization of normal propyl ethylene with hexadiene, as follows:—A mixture of these unsaturated hydrocarbons in the proportion of about one to two mols of normal propyl ethylene to about one mol of hexadiene, is reacted in the presence of a suitable activating agent such as powdered anhydrous aluminum chloride, with agitation of the mixture. This activating material is added in small quantities at a time, while the temperature of the reacting mass is controlled to prevent objectionable rise of temperature. The reaction is preferably carried out above 20° C., very satisfactory results being obtained between 25° and 35° C. The addition of aluminum chloride is repeated with continuous agitation until no further temperature rise results.

In addition to aluminum chloride other compounds which hydrolyze in water giving an acid reaction will function satisfactorily to cause the conversion of unsaturated hydrocarbons into resin,—for example, chloride of iron, boron, zinc, antimony, titanium and tin; benzene sulfonic acid; propyl alcohol saturated with HCl gas; ethyl sulfate and aniline hydrobromide. The reaction is preferably completed in less than 12 hours, about 4 to 6 hours giving optimum results.

The resulting reaction product is a viscous mass dark in color. This viscous material is then neutralized to terminate or kill the polymerizing reaction. Various water soluble alkalies may be used for this neutralizing, but preferably ammonium hydroxide is employed as the excess of this material can be removed by distillation and has no injurious effects on the resulting resin. The neutralizing treatment is preferably carried out in the presence of a non-aqueous organic hydroxy compound, such as an alcohol. Thus a mixture of about 40% by volume of ammonium hydroxide containing 28% NH3 by weight and 60% by volume of 95% ethyl alcohol gives good results. The mass is agitated constantly during the neutralization and a granular precipitate of the activating agent is produced which is readily removed by filtration—for example where aluminum chloride is used a precipitate of aluminum hydroxide is formed. The neutralization is accompanied by a color change, the reacting mass changing from a black or dark red to a yellowish red as the neutralization is completed. The agitating and neutralizing action is completed in about a half hour.

A portion of the resin reaction product may also precipitate, and in order to insure complete solution of the resin before filtration, an organic solvent which is immiscible in water, such as benzol, carbon tetrachloride, or the like, is added to the neutralized mass before filtration. When reacting unsaturated hydrocarbons in this manner, it is found that two products are formed, one being an amorphous resin compound readily soluble in organic solvents such as benzol, and another being a gelatinous compound insoluble in such solvents. This insoluble compound is carried down in the precipitate. The material is then filtered to remove the precipitated material and to free the reaction product from the activating agent. The filtrate is then distilled to approximately 100° C. when substantially all of the alcohol and benzol, and any water, will have been driven off of the resulting resin, which remains as a semi-fluid or a pasty mass. The resin product obtained by the above described method, and hereinafter referred to as "soft resin", is a semi-solid containing some unsaturated hydrocarbon oils, which may be said to hold the resin in solution. If desired the concentration of the resin may be controlled so as to leave a calculated amount of solvent in the resin so that it is maintained in solution form, and usable as such. The solvent used may be a suitable paint or varnish solvent such as benzol or naphtha so that the concentrated solution obtained by partial distillation may be used directly as a protective coating material.

If a solid resin is desired the distillation is continued as described above until substantially all of the readily volatile solvents have been driven off, sufficient solvent or retained higher oils being left in the resin to form a semi-fluid pasty mass. When a hard resin is desired this semi-fluid mass containing higher oils may be further purified either by solution and reprecipitation or by a drying treatment. In using solution and reprecipitation the pasty mass is dissolved in an organic solvent which is immiscible in water such as benzol, and is then reprecipitated by the addition to the solution of a quantity of an organic solvent which is miscible with water such as alcohol. This mass stratifies into two layers, a lower layer containing the precipitated resin, and an upper layer of the mixed benzol and alcohol containing therein the dissolved higher oils. The precipitated resin may be separated by filtration or decantation and dried, a harder resin being thereby obtained which is substantially free from higher oils.

In using the drying method the pasty mass may be dried by passing a non-oxidizing gas such as carbon dioxide through the mass, while the same is being agitated and heated to a temperature of about 180° C. This treatment drives off any remaining solvent and higher oils which tend to make the resin soft. The resulting resin is then allowed to cool and harden. The resin product obtained by the above described method and hereinafter referred to as "hard resin", is a true solid substantially free from unsaturated hydrocarbon oils, and varying in degree of hardness.

The proportions in which olefine and diolefine compounds are used in this reaction, largely determine the character and yield of the resultant resin. When a diolefine alone, such as isoprene, is treated in the manner described a negligible amount of resinous material is obtained. When an olefine, such as amylene, is treated alone in the manner described, a heavy oil results, and a hard resin cannot be produced. By properly proportioning the quantities of olefine and diolefine, a happy medium is struck between the yield of resin and the hardness or quality of the resin. A good hard resin can be obtained by reaction of an olefine with a diolefine in relative proportions ranging from approximately 40% to 60%; the use of approximately one mol of an olefine, such as amylene, to one mol of a diolefine, such as isoprene giving a very satisfactory resin. As the proportion of olefine is increased the resultant resin is softer, and vice versa, as the proportion of diolefine is increased the resin is harder. Within the specified proportions to produce best yields, the resin may be freed of unsaturated oils and so hardened, by the reprecipitation or drying processes previously described; but increasing the relative proportion of olefine above that specified,—that is, a mixture of more than 60% of olefine will produce a correspondingly softer resin which will not harden satisfactorily even on drying or reprecipitation. On the other hand, increasing the relative proportion of diolefine, that is to more than 60% of diolefines, will produce a correspondingly harder resin but with an increasingly poorer yield. The most suitable proportions for various unsaturated hydrocarbon mixtures can be readily determined by experiment in each case, and these proportions used in plant operation for optimum yield of the particular resin desired.

The term "unsaturated hydrocarbons" as used herein refers to hydrocarbon compounds which unite with other compounds, such for example, as the halogens, to form addition products without splitting off a new compound. Such unsaturated compounds are capable of giving the Baeyer test for unsaturation. (Text Book of Organic Chemistry, Holleman, 6th edition, page 131). It is to be understood that the term unsaturated hydrocarbons as used herein is intended to include compounds of the class described above which are derived from petroleum distillates, as for example by cracking processes, and which are substantially free from coumarone-indene constituents.

While the exact chemical reaction taking place is not definitely known, it appears that the reaction between the olefine, or hydrocarbon having an ethylene or methylene linkage and having one double bond, and the diolefine, or aliphatic diene having more than one double bond, is first a reaction of the former with the latter, whereby a cyclic diene having more than one double bond is produced. The molecules of the cyclic diene may then unite by polymerization to give unsaturated cyclic hydrocarbons of high molecular weight, thereby producing the resin of the present invention. This resin has been found to be an unsaturated hydrocarbon believed to have the empirical formula $(C_nH_{2n-2})_x$, and possessing a molecular weight of about 900 to 1400.

The resin so prepared in accordance with this invention is found to have a yellow shading to amber color, and is generally clear. When dissolved in a suitable solvent such as naphtha, the resin forms a clear amber liquid, which when brushed onto a surface leaves a clear film which is practically colorless or has only a faint yellowish color. The prepared resin is also unsaponifiable and substantially neutral in reaction, that is having an acid number of 0—2.

In making the coating materials of this invention, the resin above described is placed with the desired drying oil or combination of oils, in weighed amounts determined by the type of material desired, in a suitable vessel, and heated to a suitable reacting temperature. Satisfactory results in practical operations have been secured by controlling the temperature between about 280°C. and 320° C. The heating is continued until the oils and resin have acquired a satisfactory "body", or degree of consistency. This is judged by the appearance and other characteristics and tests generally employed in the bodying step in varnish making. For a mix of about 1000 g. about one hour is required for the heating, when the usual "body" is desired; but the exact time of heating will vary with the volume of the mix and the consistency desired. The properly heated mixture is allowed to cool, then thinned with a varnish thinner, such as mineral spirits, to obtain the desired viscosity. Instead of varnish thinners, cheap thinners such as gasoline, or naphtha may be used. Materials thus produced having relatively high viscosity are generally suitable for use as varnish, while those having relatively lower viscosity are suitable for enamels or paints, or for an undercoating. When the coating is air dried, the drying may be greatly expedited by the use of metallic driers, such as cobalt or manganese resinate or linoleate. Other metallic driers such as copper, vanadium or cerium or linoleates may be used. When the film is baked, as is often the practise with undercoats for lacquers, the addition of a drier is not necessary. After addition of a thinner, and drier as desired, if the material is to be used as a varnish, it is then ready for packing and distribution.

When the material is used as a paint, enamel, or undercoat, pigments are added to the varnish produced. In such case the varnish and pigments in the desired proportions are mixed in a mechanical mixer or by other suitable means, and the thoroughly mixed materials are then ground in a buhr-stone mill or other suitable type of mill. In ordinary practice temperatures of the mixture during grinding are generally controlled below about 70° C. to prevent undesired reaction, or vaporization of thinner when present. The time required for grinding depends on the fineness desired and the type of mill used. Finishing enamels are usually made very fine, inside paints fine and outside paints relatively less fine. The degree of fineness depends for the most part on the established standard of the individual manufacturer. When the desired degree of fineness is reached the material is removed from the mill in the form of a paste. To this paste more varnish is added until the desired consistency is reached for use as paint or enamel.

Oils such as China-wood oil, linseed oil, perilla oil, soya bean oil, fish oil, etc. are known as drying oils, and have the property of forming on drying a tough elastic film of varying degrees of hardness. This film is generally believed the result of a combined polymerization and oxidation reaction which begins during the cooking of the varnish to body it, and is completed during the drying process, after it is applied. Ordinary acidic resins when combined with drying oils retard these reactions, whatever they may be. The resin of our invention not only does not retard the action of the drying oils, but, accelerates it,— probably due to being unsaturated, wherefore it reacts with the drying oils and accelerates their polymerization and oxidation. Consequently, a quick drying coating material of superior quality is produced.

The coating materials described, to which a metallic drier has been added, with or without pigments, and using relatively cheap thinners, such as gasoline, have been found to produce a film which will air dry (that is dry to a usable film suitable for recoating) within one hour. This drying time compares favorably with more expensive lacquers and paints, and the resulting film is of excellent quality, resistant to outside exposure, waterproof and durable. If the somewhat more expensive solvents, such as toluol, benzol, or xylol are used in place of the cheaper solvents, the drying time is still shorter.

We have also discovered that a coating material of excellent quality can be produced by the reaction of castor oil together with a usual drying oil with the resin hereinbefore described. The reaction product of castor oil and a drying oil with this resin when used as a coating material, gives a film particularly suitable for use where the film is dried by baking, as for an undercoat for lacquers. The film is more elastic, more durable, more adhesive and more impervious to water than those produced by the use of drying oils with other resins heretofore used, the film being so superior as to overbalance the slightly greater cost of castor oil over drying oils. A non-drying oil, such as castor oil, does not enter into combination with other generally used synthetic resins, and a suitable protective coating material which is satisfactory is not formed by use of such other synthetic resins with castor oil in conjunction with the usual drying oils.

The film resulting from this material does not "lift" when used as an undercoat for lacquer. When lacquer is applied the undercoating material is softened. When the film of the undercoat expands on softening, causing the undercoat and the finish coat to recede from the surface to be coated, the resultant failure of the film is known as "lifting". Complete protection from this common failure of lacquer is a valuable attribute of this coating material.

The exact proportions of resin and other materials required to produce a satisfactory coating material suitable for a specific purpose are usually determined by experiment. Examples of the specific application of this invention are the following type formulas which are used to produce a coating material particularly suitable for the use specified in each case. Other type formulas may be readily devised for other specific purposes.

Formula suitable for undercoating for lacquers or paint:

*Composition A*

| | Percent by weight |
|---|---|
| Hard resin | 25 |
| China-wood oil | 8 |
| Blown castor oil | 12 |
| Standard gasoline | 55 |

Heated to approximately 277° C. for two hours.

The above material, hereinafter referred to as Composition A, used with a metallic drier:

83% of Composition A, 17% of a mixture of Composition A containing 1% lead linoleate.

The coating material used with a pigment:

40% of the Composition A, 60% pigment paste, consisting of 20% lithopone ZnS plus $BaSO_4$, 40% titanox $TiO_2$ plus $BaSO_4$, 40% Composition A.

Formula suitable for use as a lacquer:

| | Per cent |
|---|---|
| Hard resin | 28.6 |
| China-wood oil | 14.3 |
| Mineral spirits | 55.7 |
| Manganese linoleate solution | 0.3 |
| Cobalt linoleate solution | 0.3 |
| Lead linoleate | 0.8 |

Manganese and cobalt linoleate solutions are in the proportions of one part cobalt or manganese linoleate to 3 parts turpentine or mineral spirits.

Heated to 294° C. for less than ½ hour.

Formula suitable for undercoat:

| | Per cent |
|---|---|
| Hard resin | 26 |
| China-wood oil | 8 |
| Soya bean oil (added at 305° C.) | 26 |
| Mineral spirits | 40 |

Heated to 316° C. for ½ hour. All percentages given above are percentages by weight.

It has been found that the coating material of our invention is especially adaptable to the use of pigments, since it does not react with them and also has unusually good non-settling or "soft settling" properties when used with pigments. That is, pigments are maintained in suspension for relatively long periods, and on standing for long periods of time the pigments settle into a soft mass which is capable of being remixed to a uniform consistency.

This material has been found especially adapted to use with white and light colored pigments as a coating for materials which react with ordinary coating compounds. For example, when white coatings made from other resins are applied to articles made from bituminous compositions, such compositions may "bleed through". That is, the coating may be discolored as a result of reaction between the bituminous composition and the coating material. The coating material of our invention does not react with such materials but has the valuable property when applied as a prime coat, of "sealing" the material to be coated, so that the color and quality of the finish coat is unimpaired. This coating material produces a hard-drying film, impervious to water, and very resistant to acids, alkalies and gases. Consequently, this coating material is particularly adapted for a "sealing coat" for use with lacquers or other finish coating materials.

It has usually been found that resins having the valuable quality of neutrality, also have a characteristic very undesirable in a protective coating, that of a yellowing film; that is, one which yellows after drying. This is especially objectionable when white and light colored pigments are used. The coating material of this invention is substantially neutral in reaction, and also produces a highly satisfactory non-yellowing film.

It has usually been necessary in making coating materials from a synthetic resin to limit the use of the material made from a particular resin to certain specific uses. The material of our invention has been found to be equally satisfactory for various types of coating, both for inside and outside finish. The fact that this material is soluble in relatively cheap solvents, such as gasoline; in all paint and varnish solvents, and also in other organic solvents, adds greatly to the adaptability of the material and its convenient and economical manufacture.

It has been found that the coating material of our invention provides a markedly superior protective coating, which effectively combines the most desirable characteristics essential to such materials, and which is substantially free from undesirable qualities.

While the features herein described constitute preferred embodiments of our invention it is to be understood that the invention is not limited to these precise features, and that changes may be made therein without departing from the scope of the invention which is defined in the appended claims.

What is claimed is:

1. A protective coating material comprising as ingredients thereof castor oil, a drying oil, and an unsaturated hydrocarbon substantially completely gasoline-soluble resin produced from a fraction of cracked petroleum distillate, the resin being substantially completely insoluble in alcohol and in acetone.

2. A protective coating material comprising the combination of a drying oil with a substantially neutral and non-yellowing substantially completely gasoline-soluble hydrocarbon resin produced from cracked petroleum distillate, the resin-oil product being in solution in one of a group of solvets comprising gasolines and naphthas, the solution having the property of forming a film which dries by baking within one hour.

3. A protective coating material comprising the reaction product of a mixture of a drying oil and a non-drying oil with a synthetic hydrocarbon resin produced by polymerization in the presence of a metallic halide catalyst of a mixture of unsaturated hydrocarbons of varying degrees of unsaturation including an olefine and a diolefine, the resin being substantially completely insoluble in alcohol and in acetone, and substantially completely soluble in gasoline.

4. A product for use as a coating comprising the reaction product of a drying oil and a non-drying oil with a hydrocarbon resin produced from unsaturated hydrocarbons present in cracked petroleum distillate, the resin being substantially completely insoluble in alcohol and in acetone, and substantially completely soluble in gasoline and capable of forming a clear solution therewith.

5. A protective coating material comprising the reaction product of a drying oil and a substantially neutral, non-yellowing, gasoline soluble hydrocarbon resin obtained by the polymerization of a cracked petroleum distillate, said resin-oil reaction product being in solution in a petroleum naphtha solvent.

6. A protective coating material comprising the reaction product of China-wood oil and a substantially neutral, non-yellowing, gasoline soluble hydrocarbon resin obtained by the polymerization of a cracked petroleum distillate, said resin-oil reaction product being in solution in a petroleum naphtha solvent.

7. A protective coating material comprising the reaction product of a mixture of a drying and a non-drying oleaginous oil with a synthetic, substantially neutral, non-yellowing, gasoline soluble hydrocarbon resin resulting from the polymerization of a cracked petroleum distillate that is substantially free of coumarone-indene constituents, the reaction product being in solution in a petroleum naphtha solvent.

8. A protective coating material comprising the reaction product of China-wood oil and castor oil with a synthetic, substantially neutral, non-yellowing, gasoline soluble hydrocarbon resin resulting from the polymerization of a cracked petroleum distillate that is substantially free of coumarone-indene constituents, the reaction product being in solution in a petroleum naphtha solvent.

9. A protective coating material comprising the reaction product of a drying and a non-drying oleaginous oil with a substantially neutral, reactive, unsaturated, non-yellowing hydrocarbon polymer produced from a cracked petroleum distillate rich in unsaturates, and substantially free of coumarone-indene constituents, the resin-oil reaction product being soluble in a petroleum naphtha solvent.

10. The product as defined in claim 9 and further characterized in that the polymer has a molecular weight of 900-1400.

11. A coating composition comprising a petroleum naphtha solvent, a drier and a reaction product of a drying oil, and a synthetic, substantially neutral, reactive, unsaturated, non-yellowing hydrocarbon polymer produced from a cracked petroleum distillate rich in unsaturates and substantially free of coumarone-indene constituents.

12. A coating composition comprising a petroleum naphtha solvent, a drier and a reaction product of a mixture of a drying and non-drying oleaginous oil with a substantially neutral, reactive, unsaturated, non-yellowing hydrocarbon polymer produced from a cracked petroleum distillate rich in unsaturates and substantially free of coumarone-indene constituents.

13. A protective coating material comprising a petroleum naphtha solvent, a drier and the reaction product of China-wood oil with a substantially neutral, reactive, unsaturated, non-yellowing hydrocarbon polymer produced from a cracked petroleum distillate rich in unsaturates and substantially free of coumarone-indene constituents, the resin-oil reaction product being soluble in a petroleum naphtha solvent.

14. A protective coating material comprising a petroleum naphtha solvent, a drier and the reaction product of tung oil and castor oil with a substantially neutral, reactive, unsaturated, non-yellowing hydrocarbon polymer produced from a cracked petroleum distillate rich in unsaturates and substantially free of coumarone-indene constituents, the resin-oil reaction product being soluble in a petroleum naphtha solvent.

15. A protective coating material comprising the petroleum naphtha soluble reaction product of a drying oil with a substantially neutral resinous hydrocarbon product formed by polymerization of a fraction of cracked petroleum distillate rich in olefines and diolefines, the polymerization product being substantially completely soluble in gasoline and substantially completely insoluble in alcohol and in acetone, and not retarding the drying of linseed oil, said coating material being dissolved in essentially a petroleum hydrocarbon solvent.

16. A protective coating material comprising the reaction product of a drying oil with a substantially neutral resinous hydrocarbon product formed by polymerization in the presence of a metallic halide catalyst of a liquid mixture of unsaturated hydrocarbons including an olefine and a diolefine, the polymerization product being substantially completely insoluble in alcohol and in acetone, and substantially completely soluble in gasoline, said coating material being dissolved in essentially a petroleum hydrocarbon solvent.

17. A protective coating composition comprising the combination of a petroleum hydrocarbon solvent, and a reaction product of a drying oil with a substantially neutral unsaturated hydrocarbon polymerization product formed by polymerization of a liquid fraction of cracked petroleum distillate containing olefines and diolefines in the presence of anhydrous aluminum chloride while maintaining a temperature not substantially above 35° C., the polymerization product being substantially completely soluble in gasoline and substantially completely insoluble in alcohol and acetone, and not retarding the drying of linseed oil.

18. A protective coating composition comprising the combination of a petroleum hydrocarbon solvent, China-wood oil and a substantially non-yellowing neutral resinous hydrocarbon product formed by polymerization of a liquid, cracked petroleum distillate, rich in olefines and diolefines, the polymerization product being substantially completely soluble in gasoline and substantially completely insoluble in alcohol and in acetone, and not retarding the drying of linseed oil.

19. A protective coating material comprising a petroleum hydrocarbon solvent having dissolved therein the reaction product of at least one drying oil with a substantially neutral hydrocarbon polymerization product formed by polymerization of a liquid fraction of unsaturated cracked petroleum distillate in the presence of anhydrous aluminum chloride while maintaining a temperature not substantially above 35° C., the polymerization product being substantially completely soluble in gasoline and substantially completely insoluble in alcohol and acetone, and not retarding the drying of linseed oil.

20. A protective coating composition comprising the combination of a petroleum hydrocarbon solvent, a drying oil and an unsaturated, substantially neutral resinous hydrocarbon polymer soluble in petroleum naphtha and insoluble in alcohol and in acetone, and formed by the polymerization of a fraction of liquid cracked petroleum distillate containing olefines and diolefines, the composition being capable of forming a film which dries by baking within one hour.

21. A protective coating composition comprising the combination of a petroleum hydrocarbon solvent and the reaction product of a drying oil with an unsaturated substantially neutral resinous hydrocarbon, formed by the polymerization of a fraction of liquid cracked petroleum distillate in the presence of a metallic halide catalyst, the composition being capable of forming a film which dries by baking within one hour.

22. A protective coating composition comprising the combination of a petroleum hydrocarbon solvent, a drying oil and a substantially neutral, gasoline-soluble, unsaturated hydrocarbon polymerization product formed by the polymerization of a fraction of cracked petroleum distillate, the composition having the property of forming a film which air dries within two hours.

23. A protective coating composition comprising the combination of a petroleum hydrocarbon solvent, China-wood oil and a substantially neutral, gasoline-soluble, unsaturated hydrocarbon polymerization product formed by the polymerization of a liquid fraction of cracked petroleum distillate in the presence of a metallic halide catalyst, the composition having the property of forming a film which dries by baking within one hour.

24. A protective coating composition comprising the combination of a petroleum hydrocarbon solvent, a drier and a reaction product of a drying oil with a substantially neutral gasoline-soluble, unsaturated hydrocarbon polymerization product formed by the polymerization of a liquid fraction of cracked petroleum distillate in the presence of metallic halide catalyst, the composition having the property of forming a film which air dries within two hours.

25. A protective coating composition comprising the combination of a petroleum hydrocarbon solvent having dissolved therein the reaction product of a drying oil with an unsaturated solid hydrocarbon resin which is non-saponifiable, substantially neutral, gasoline-soluble, and which is formed by the polymerization of a liquid fraction of cracked petroleum distillate in the presence of anhydrous aluminum chloride while maintaining a temperature not substantially above 35° C. during the polymerization.

26. The method of preparing an air drying protective coating composition that comprises combining at bodying temperature a drying oil with a substantially neutral unsaturated resinous hydrocarbon product obtained by polymerization of a fraction of cracked petroleum distillate, the polymerization product being substantially completely soluble in gasoline and being substantially completely insoluble in alcohol and acetone, said heating being continued until the desired degree of bodying is attained, subsequently cooling the reacted mixture and thereafter adding a thinner and drier, said thinner consisting of a petroleum hydrocarbon solvent.

27. The method of preparing an air drying protective coating composition that comprises combining at bodying temperature a drying oil with a substantially neutral unsaturated resinous hydrocarbon product obtained by polymerization of a fraction of cracked petroleum distillate, the polymerization product being substantially completely soluble in gasoline and being substantially completely insoluble in alcohol and acetone, said heating being continued until the desired degree of bodying is attained, and subsequently cooling the reacted mixture substantially below the bodying temperature, and finally adding a drier and thinner.

28. A protective coating material comprising the combination of China-wood oil with a substantially neutral and non-yellowing, substantially completely gasoline-soluble hydrocarbon resin produced from cracked petroleum distillate, the resin-oil product being in solution in one of a group of solvents comprising gasolines and naphthas, the solution having the property of forming a film which dries by baking within one hour.

29. A protective coating composition comprising the combination of a petroleum hydrocarbon solvent, a drier, China-wood oil and a substantially neutral petroleum naphtha-soluble resinous hydrocarbon polymer produced by polymerization of a cracked petroleum distillate, the coating composition having the property of air drying within two hours.

30. A protective coating composition comprising the combination of a petroleum hydrocarbon solvent, a drier and the reaction product obtained by bodying China-wood oil with a substantially neutral petroleum naphtha-soluble resinous hydrocarbon polymer produced by polymerization of a cracked petroleum distillate, the coating composition having the property of air drying within two hours.

CHARLES A. THOMAS.
CARROLL A. HOCHWALT.